(12) United States Patent
Furukawa

(10) Patent No.: US 7,587,806 B2
(45) Date of Patent: Sep. 15, 2009

(54) METHOD OF MANUFACTURING AN ULTRASONIC SENSOR

(75) Inventor: Kenichi Furukawa, Atsugi (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 12/081,878

(22) Filed: Apr. 23, 2008

(65) Prior Publication Data
US 2008/0307623 A1    Dec. 18, 2008

(30) Foreign Application Priority Data
Jun. 12, 2007    (JP) .............................. 2007-155271

(51) Int. Cl.
*H04R 31/00*    (2006.01)
(52) U.S. Cl. .................... 29/594; 29/25.35; 29/609; 29/609.1; 29/856; 29/868; 83/169; 310/333; 310/334; 310/335; 310/357; 310/367
(58) Field of Classification Search .............. 29/25.35, 29/591.1, 594, 602.1, 609, 609.1, 856, 868; 83/169; 310/333–337, 357, 367
See application file for complete search history.

(56) References Cited

U.S. PATENT DOCUMENTS
4,704,774 A * 11/1987 Fujii et al. ................. 29/25.35

2006/0175929 A1 * 8/2006 Sawada et al. .............. 310/312

FOREIGN PATENT DOCUMENTS

| JP | 09-284896 | 10/1997 |
|---|---|---|
| JP | 11-266498 | 9/1999 |
| JP | 2000-032594 | 1/2000 |
| JP | 2002-209294 | 7/2002 |

* cited by examiner

*Primary Examiner*—Paul D Kim
(74) *Attorney, Agent, or Firm*—IPUSA, PLLC

(57) ABSTRACT

A method of manufacturing an ultrasonic sensor including a case, a piezoelectric element having first and second electrodes, and a conductive member having first and second conductive parts is disclosed. The method includes the steps of a) forming the conductive member by integrally forming the first and second conductive parts and a joining part that joins portions of the first and second conductive parts, b) mounting the piezoelectric element and the conductive member in the case so that the first conductive part is connected to the first electrode and the second conductive part is connected to the second electrode, and the joining part and the portions of the first and second conductive parts joined by the joining part are positioned outside of the case, c) supplying a filling material into the case, and d) removing the joining part after step c).

4 Claims, 7 Drawing Sheets

METHOD OF MANUFACTURING AN ULTRASONIC SENSOR

BACKGROUND OF THE INVENTION

1. Field of the Invention

The present invention generally relates to a method of manufacturing an ultrasonic sensor.

2. Description of the Related Art

An ultrasonic sensor is configured to generate an ultrasonic wave and receive a part or the entire generated ultrasonic wave reflected back to the ultrasonic sensor. The ultrasonic sensor is used in, for example, an obstacle detecting system that detects an object by intermittently generating an ultrasonic wave in a particular direction(s) and receiving a part or the entire generated ultrasonic wave reflected from an obstacle situated in this direction. The ultrasonic sensor may also be used for a range finding system configured to measure a distance from a target object. The range finding system, which uses the ultrasonic wave sensor to transmit an ultrasonic wave and receive a reflected ultrasonic wave echoing in response to the transmitted ultrasonic wave, measures the difference in time between the ultrasonic wave being transmitted and the reflected ultrasonic wave being received and calculates the distance from a target object according to the measured time difference.

FIG. 11 shows an exemplary configuration of a conventional ultrasonic sensor 10.

The ultrasonic sensor 10 mainly includes a sensor case 11, a piezoelectric element 12 provided on a bottom part of the sensor case 11 and, using the bottom part of the sensor case 11 as a vibration plate, a terminal (conductive material) 13 in conductive connection with both electrodes situated on the upper and lower side of the piezoelectric element 12 while being connected to an external circuit of the sensor case 11, and a wire 14 connected to the terminal 13 and the piezoelectric element 12. The sensor case 11 has a configuration allowing a filling material 15 to be supplied therein for preventing liquid droplets from entering (See Japanese Laid-Open Patent Application Nos. 9-284896, 11-266498, 2000-32594, and 2002-209294).

Typically, in order to provide a piezoelectric property during a stage of manufacturing a piezoelectric element of an ultrasonic sensor that generates ultrasonic waves, a polarizing (poling) process (process of applying a strong direct current electric field) is performed on the piezoelectric element. By performing the poling process, electric dipoles in the piezoelectric element (in this example, a piezoelectric ceramic) become aligned in a certain direction and the dipole moment remains even after removal of the electric field due to the ferroelectric property of the piezoelectric ceramic. Thereby, the piezoelectric ceramic attains a piezoelectric property. However, the poled piezoelectric ceramic has a characteristic of creating a voltage and causing polarization loss in a case where thermal change occurs in the poled piezoelectric ceramic (e.g., by application of heat).

In a case where the filling material 15 serving to protect the sensor case 11 is supplied into the sensor case 11 during a stage of manufacturing the piezoelectric sensor 10, heat is applied to the piezoelectric element. Thereby, polarization loss occurs in the piezoelectric ceramic.

SUMMARY OF THE INVENTION

The present invention provides a method of manufacturing an ultrasonic sensor that substantially eliminates one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects of the present invention, as well as other features and advantages, will be realized and attained by a method of manufacturing an ultrasonic sensor particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides a method of manufacturing an ultrasonic sensor including a case, a piezoelectric element having first and second electrodes, and a conductive member having first and second conductive parts, the method including the steps of a) forming the conductive member by integrally forming the first and second conductive parts and a joining part that joins portions of the first and second conductive parts, b) mounting the piezoelectric element and the conductive member in the case so that the first conductive part is connected to the first electrode and the second conductive part is connected to the second electrode, and the joining part and the portions of the first and second conductive parts joined by the joining part are positioned outside of the case, c) supplying a filling material into the case, and d) removing the joining part after step c).

According to another embodiment of the present invention, the conductive member may be formed by using a cladding material.

According to another embodiment of the present invention, the step a) may include a step of punching out the conductive member from a planar conductive material.

According to another embodiment of the present invention, the method of manufacturing an ultrasonic sensor may further include a step of forming a notch part on each end of the joining part.

Other objects and further features of the present invention will be apparent from the following detailed description when read in conjunction with the accompanying drawings.

DESCRIPTION OF THE PREFERRED EMBODIMENTS

In the following, embodiments of the present invention will be described with reference to the accompanying drawings.

Figure 1:
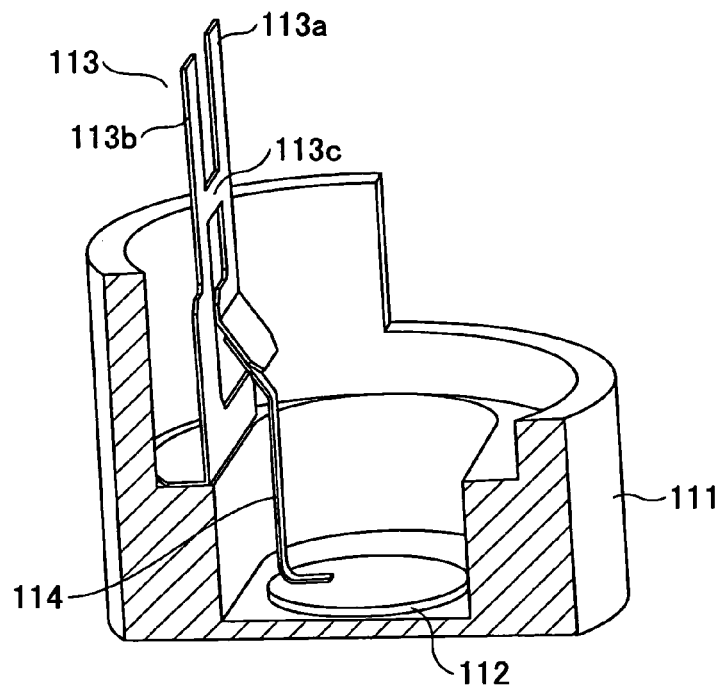
FIG. 1 is a cross-sectional perspective view showing an ultrasonic sensor according to an embodiment of the present invention.
Figure 2:
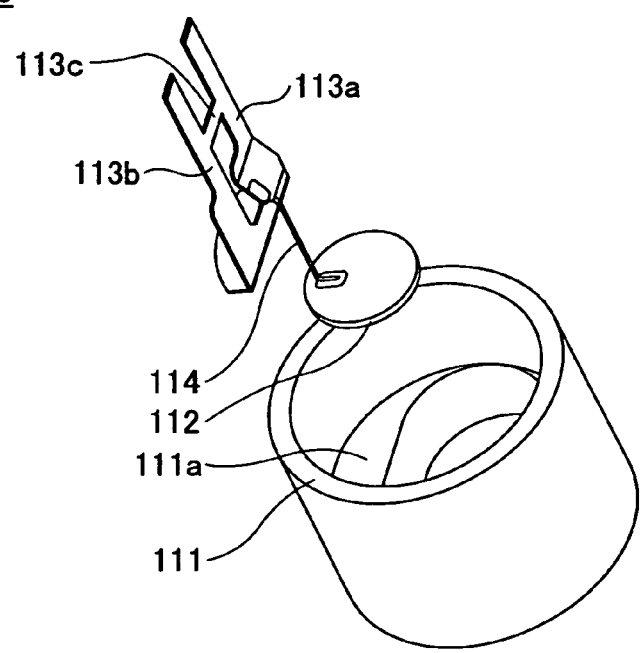
FIG. 2 is an exploded perspective view showing an ultrasonic sensor according to an embodiment of the present invention.

Prior to describing the method of manufacturing an ultrasonic sensor according to an embodiment of the present invention, an exemplary configuration of the ultrasonic sensor manufactured according to an embodiment of the present invention is described. FIG. 1 is a cross-sectional perspective view showing an ultrasonic sensor 100 according to an embodiment of the present invention. FIG. 2 is an exploded perspective view showing the ultrasonic sensor 100 according to an embodiment of the present invention.

The ultrasonic sensor 100, which is manufactured by the manufacturing method according to an embodiment of the present invention includes, for example, an aluminum case (hereinafter referred to as "case") 111, a piezoelectric element 112, a conductive member 113 having first and second conductive parts 113a, 113b, a lead wire 114, acoustic material 118 (for example, see FIG. 8), filling material 119 (for example, see FIG. 8), and an epoxy adhesive agent (not shown).

The case 111 is formed in a substantially cylindrical shape having an open top (open end) and a closed bottom (closed end). Because the piezoelectric element 112 generates ultrasonic waves by vibration, a material having good vibration characteristics is used in forming the case 111 (in this example, an aluminum material is used). As shown in FIG. 2, a step part 111a is formed at an inner peripheral part of the case 111. The step part 111a serves to securely position the second conductive part 113b when mounting the conductive member 113 in the case 111.

The piezoelectric element 112 converts between vibration (mechanical energy) and electrical energy in the ultrasonic sensor 100. The piezoelectric element 112 is formed of a crystal(s) of a ceramic material having a ferroelectric property. The piezoelectric element 112 is fabricated by performing a poling process on the ceramic crystal(s) by coating silver electrodes onto the upper and lower surfaces of the ceramic crystal(s) and applying high voltage to the ceramic crystal(s). The piezoelectric element 112 according to an embodiment of the present invention has an electrode 112a provided on its upper surface and another electrode 112b provided on its lower surface.

The piezoelectric element 112 is installed in the case 111 in a manner facing the bottom surface of the case 111. The second electrode 112b provided on the lower surface of the piezoelectric element 112 becomes electrically connected to the case 111 when the piezoelectric element 112 is adhered to the bottom surface of the case 111. Furthermore, by welding one end of the second conductive part 113b to the case 111, connection between the other end of the second conductive part 113b and an external circuit can be realized.

One end of the first conductive part 113a or one end of the lead wire 114 is connected to the first electrode 112a provided on the upper surface of the piezoelectric element 112 by directly soldering the one end of the first conductive part 113a or the lead wire 114 to the first electrode 112a provided on the upper surface of the piezoelectric element 112 or by using a conductive adhesive agent. The other end of the first conductive part 113a can be connected to an external circuit.

The conductive member 113 is an input/output terminal of the ultrasonic sensor 100 for inputting signals to the ultrasonic sensor 100 and outputting signals from the ultrasonic sensor 100. The conductive member 113 is conductive with respect to the first and second electrodes 112a, 112b provided on the upper and lower surfaces of the piezoelectric element 112, to thereby realize connection with an external circuit.

The conductive member 113 includes the first conductive part 113a and the second conductive part 113b. Although portions of the first conductive part 113a and the second conductive part 113b are joined by a joining part 113c (for example, see FIG. 1) at the time of forming the conductive member 113, the joining part 113c is separated from the first and second conductive parts 113a, 113b after completion of a supplying process (which includes a heating process) where the filling material 119 is supplied into the case 111. The piezoelectric element 112 and the conductive member 113 are mounted in the case 111 so that the first conductive part 113a is connected to the first electrode 112a and the second conductive part 113b is connected to the second electrode 112b, and the joining part 113c and the portions of the first and second conductive parts 113a, 113b joined by the joining part 113c are positioned outside of the case 111. For example, as shown in FIG. 1, the portion of the first and second conductive parts 113a, 113b are above the upper end of the case 111.

Figure 3:
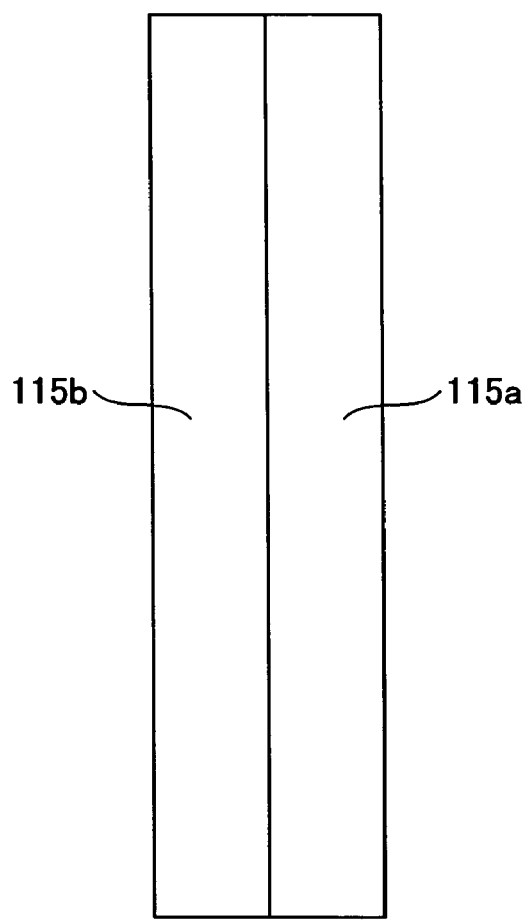
FIG. 3 is a schematic diagram showing a cladding member according to an embodiment of the present invention.
Figure 4A:
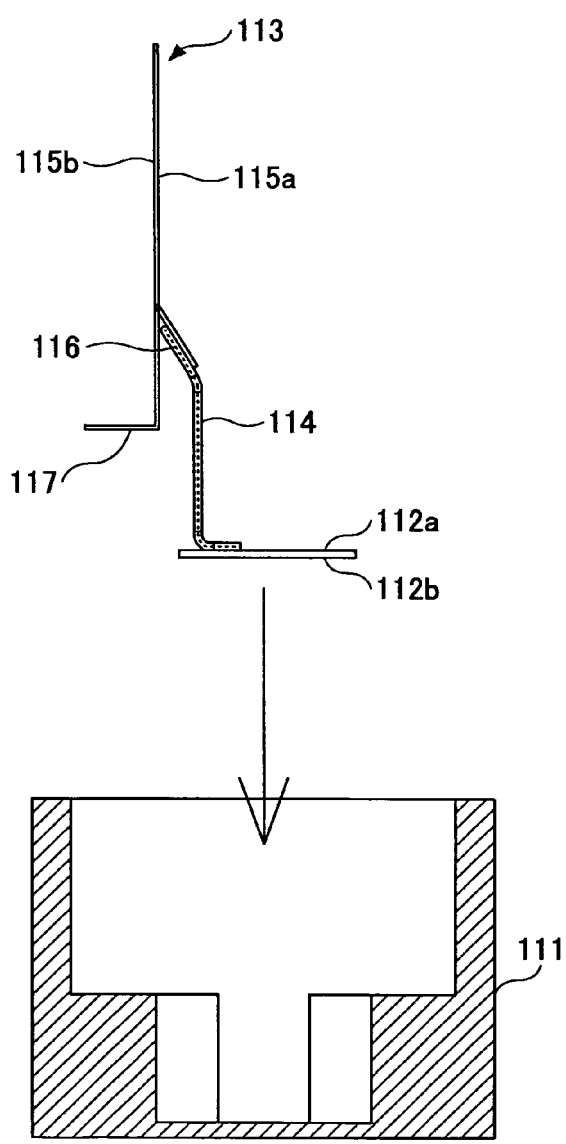
FIGS. 4A and 4B are schematic diagrams for describing an exemplary case where a piezoelectric element, a lead wire, and a conductive member are mounted in a case according to an embodiment of the present invention.
Figure 4B:
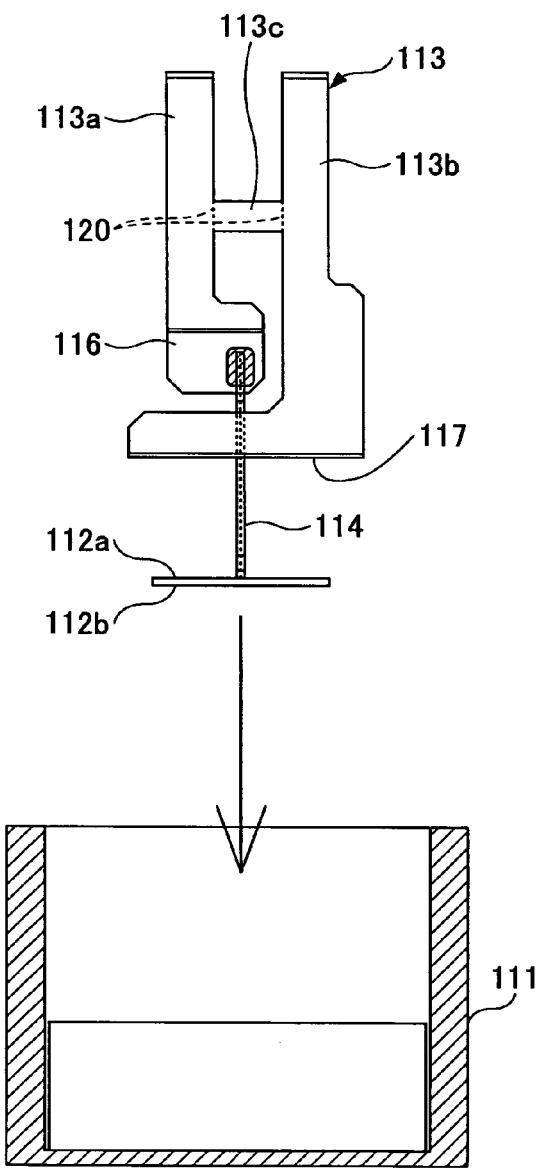

As shown in FIG. 3, the conductive member 113 according to an embodiment of the present invention is formed of a planar cladding material in which one side 115a is made of aluminum (aluminum side 115a) and the other side 115b is made of nickel (nickel side 115b). As shown in FIG. 4A, the overall configuration of the conductive member 113 is formed in an L-shape having a perpendicular part including a perpendicular plane and a bent part including a bent plane that is bent substantially 90 degrees with respect to the perpendicular part. That is, the bent plane is bent in such manner so as to fittingly engage the step part 111a of the case 111.

The first conductive part 113a includes a perpendicular portion and a facing portion 116 which is formed by bending a part of the perpendicular portion in a manner facing the piezoelectric element 112. The second conductive part 113b includes a perpendicular portion and a bent portion. The bent portion of the second conductive part 113b includes a connecting part 117 for connecting to the case 111.

The facing portion 116 of the first conductive part 113a is connected the electrode provided on the upper surface of the piezoelectric element 112 by attaching one end of the lead wire 114 to the facing portion 116 and the other end of the lead wire 114 to the electrode provided on the upper surface of the piezoelectric element 112. Thereby, the first conductive part 113a becomes electrically connected to the electrode 112a provided on the upper surface of the piezoelectric element 112. The connecting part 117 of the second conductive part 113b is connected to the case 111 by welding the connecting part 117 of the second conductive part 113b to the step part 111a of the case 111. Thereby, the second conductive part 113b becomes electrically connected to the electrode 112b provided on the lower surface of the piezoelectric element 112. Accordingly, in view of good bonding characteristics with respect to aluminum (i.e. the case 111 formed of aluminum), the cladding material used in this embodiment of the present invention has one side formed of aluminum.

The acoustic material 118 according to an embodiment of the present invention is formed of a resin material. The acoustic material 118 may be placed or laminated on the piezoelectric element 112. By placing the acoustic material 118 on the piezoelectric element 112, reverberation of the ultrasonic sensor 100 can be reduced and high sensitivity can be attained for the ultrasonic sensor 100.

The filling material 119 is provided on top of the acoustic material 118. The filling material 119 is, for example, a thermosetting resin which is cured by applying heat thereto. Because such a heating process is performed on the filling material 119 when forming the filling material 119, the heat of the filling material 119 is also transmitted to the piezoelectric element 112. This may cause the above-described problem of polarization loss in the piezoelectric element 112.

Next, an embodiment of a method of manufacturing the ultrasonic sensor 100 having the above-described configuration is described.

First, the case 111 is formed into a substantially cylindrical shape having a closed bottom (solid). For example, the case 111 is formed by cutting aluminum material into such a shape. The step part 111a is formed inside the case 111.

Then, a poling process is performed on the piezoelectric element 112 by applying a silver electrode to both ends of the crystals of the ferroelectric material (in this embodiment, ceramic material) that form the piezoelectric element 112 and supplying high voltage to the piezoelectric element 112.

Figure 5:
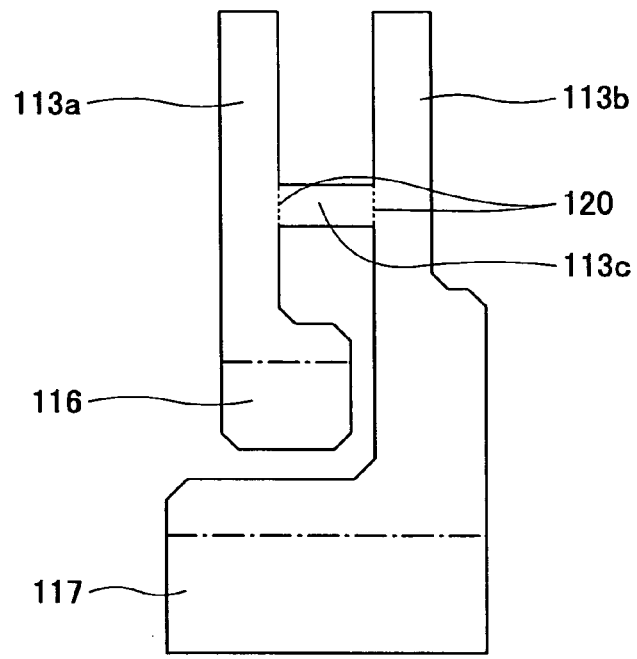
FIG. 5 is a schematic diagram showing a conductive member formed by integrally forming a first conductive part, a second conductive part, and a joining part into a united body according to an embodiment of the present invention.
Figure 7:
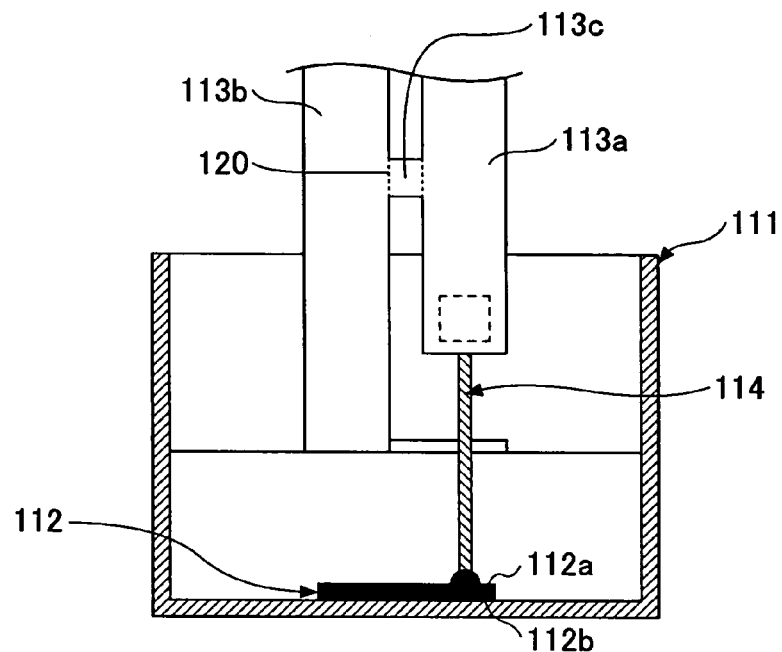
FIG. 7 is a front view showing a conductive member and a piezoelectric element mounted in a case according to an embodiment of the present invention.

Then, as shown in FIG. 5, the conductive member 113 according to an embodiment of the present invention includes: the first conductive part 113a; the second conductive part 113b; the joining part 113c for joining portions of the first and second conductive parts 113a, 113b; the facing part 116 for connecting to the electrode provided on the upper surface of the piezoelectric element 112; and the connecting part 117 for connecting to the step part 111a of the case 111. The first and second conductive parts 113a, 113b, the joining part 113c, the facing part 116, and the connecting part 117 are integrally formed into a united body by press-working the conductive member 113. More specifically, the conductive member 113 including the first conductive part 113a, the second conductive part 113b, and the joining part 113c is formed by, for example, punching out the conductive member 113 from a planar conductive material by using a press (See FIG. 5). As shown in FIGS. 5 and 7, a notch part 120 may be provided on each end of the joining part 113c so that the joining part 113c can be easily separated from the conductive member 113 after supplying the filling material 119 into the case 111.

Then, the connecting part 117 of the second conductive part 113b is bent to form the conductive member 113 into an L-shape. The connecting part 117 is bent in a manner so that the aluminum side 115a of the conductive member 113 is the side which connects to the case 111. The facing part 116 of the first conductive part 113a is bent in an opposite direction with respect to the connecting part 117 so that the facing part 116 faces the piezoelectric element 112. The facing part 116 is bent in a manner so that the plane of the facing part 116 facing the piezoelectric element 112 is the nickel side 115b of the conductive member 113.

Then, the conductive member 113 is inserted into the case 111. Then, the facing part 116 of the first conductive part 113a and one end of the lead wire 114 are soldered together. Then, the other end of the lead wire 114 and the electrode provided on the upper surface of the piezoelectric element 112 are soldered together.

Figure 6:
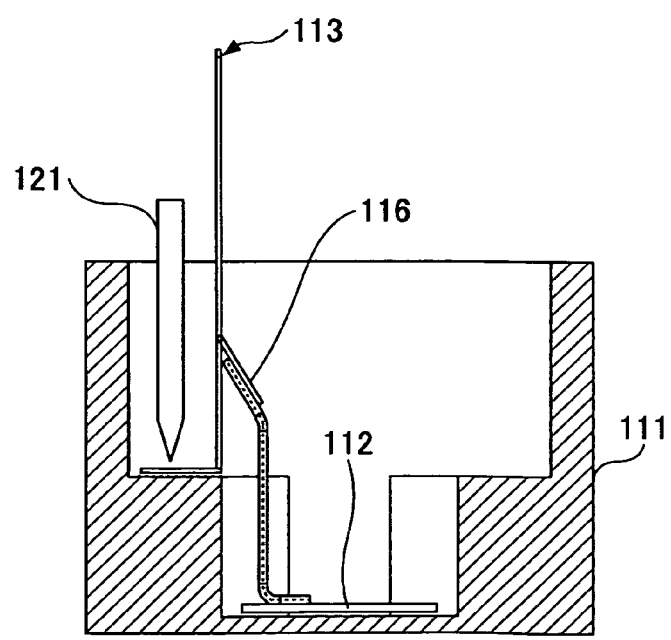
FIG. 6 is a cross-sectional view showing a conductive member and a piezoelectric element mounted in a case according to an embodiment of the present invention.

Then, as shown in FIG. 6, the connecting part 117 of the second conductive part 113b and the step part 111a of the case 111 are welded together. The welding method includes, for example, spot welding using a welding jig 112. Because the first conductive part 113a and the second conductive part 113b are joined together by the joining part 113c, there is no need to define the position of the first conductive part 113a when installing the conductive member 113 in the case 111.

That is, because the connecting part 117 abuts the step part 111a of the case 111, the position of the first conductive part 113a and the position of the second conductive part 113b can be securely defined at the same time. Thereby, the conductive member 113 and the piezoelectric element 112 can be satisfactorily mounted in the case 111.

FIG. 7 shows a step where the conductive member 113 and the piezoelectric element 112 are mounted in the case 111.

Figure 8:
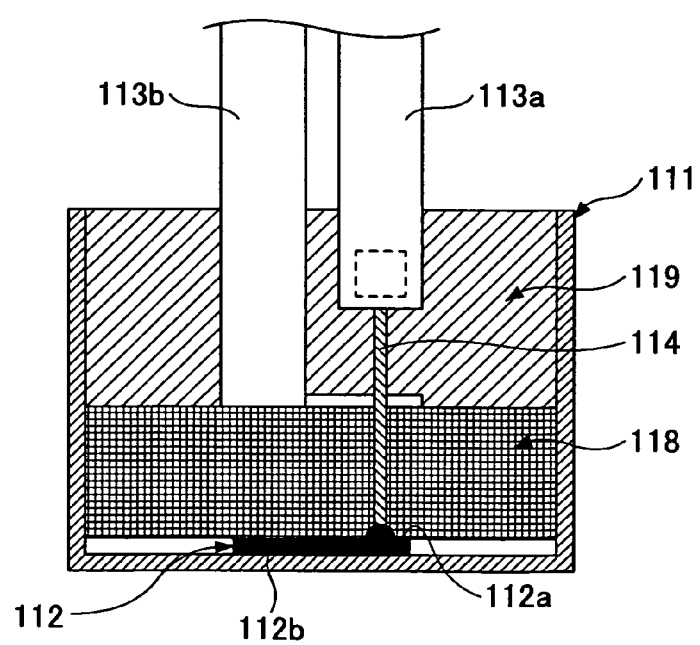
FIG. 8 is a schematic diagram showing a state where a joining part is removed from a conductive member after a filling material is supplied into a case according to an embodiment of the present invention.

FIG. 8 shows a step where the acoustic material 118 is provided in the case 111 subsequent to the step shown in FIG. 7.

Figure 9:
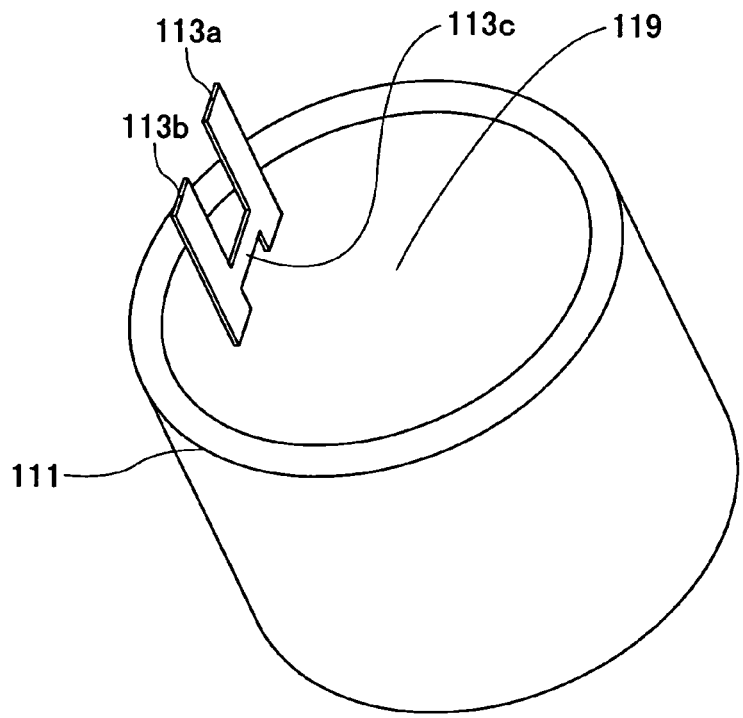
FIG. 9 is a perspective view showing a state where a filling material is supplied into a case according to an embodiment of the present invention.

Then, subsequent to the step of providing the acoustic material 118 in the case 111, the filling material 119 is supplied (inserted) into the case 111 as shown in FIGS. 8 and 9. Where the filling material 119 is supplied into the case 111, portions of the first and second conductive parts 113a, 113b as well as the joining part 113c of the conductive member 113 are positioned outside of the case 111. This allows the joining part 113c to be cut off (removed) from the conductive member 113 after the process of supplying the filling material 119 into the case 111 is completed. After completing the supplying process, the filling material 119 is cured, for example, by irradiating ultraviolet rays from the open end of the case 111. During the supplying process or the curing process (heating process), heat is also transmitted to the piezoelectric element 112, for example, from the heat of the filling material 119 or the heat generated by the heating process (curing process). Thereby, the thermal change of the piezoelectric element 112 causes the piezoelectric element 112 to generate a voltage. However, because the first and second conductive parts 113a and 113b, which are connected to the piezoelectric element 112, are joined together by the joining part 113c, the first and second conductive parts 113a and 113b are electrically shorted. Therefore, even in a case where the thermal change of the piezoelectric element 112 causes a pyroelectric effect that generates a polarization charge, no polarization loss occurs because the polarization charge is shorted by the joining part 113c. Accordingly, damage to the piezoelectric element 112 can be prevented. Hence, a highly reliable ultrasonic sensor 100 can be manufactured.

Figure 10:
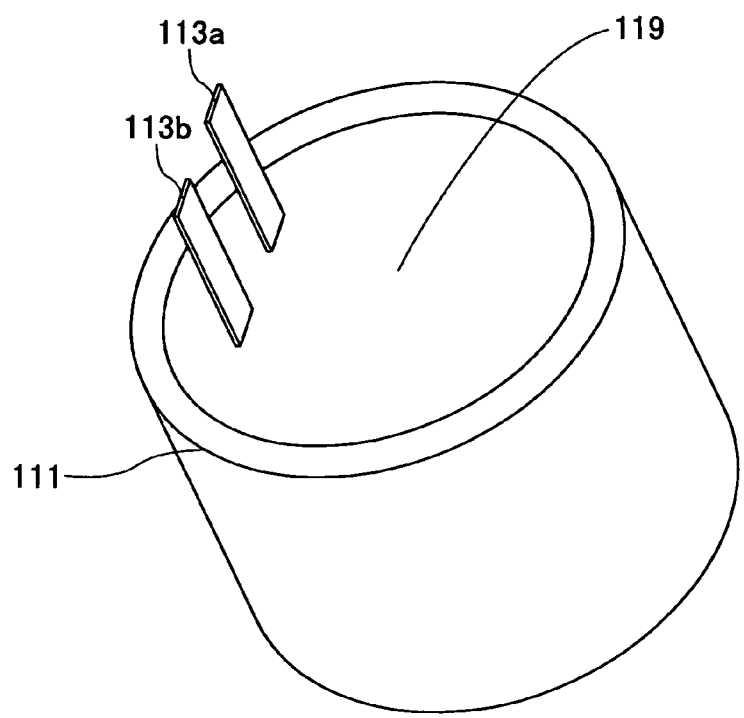
FIG. 10 is a perspective view showing a state where a joining part is removed from a conductive member after a filling material is supplied into a case according to an embodiment of the present invention.
Figure 11:
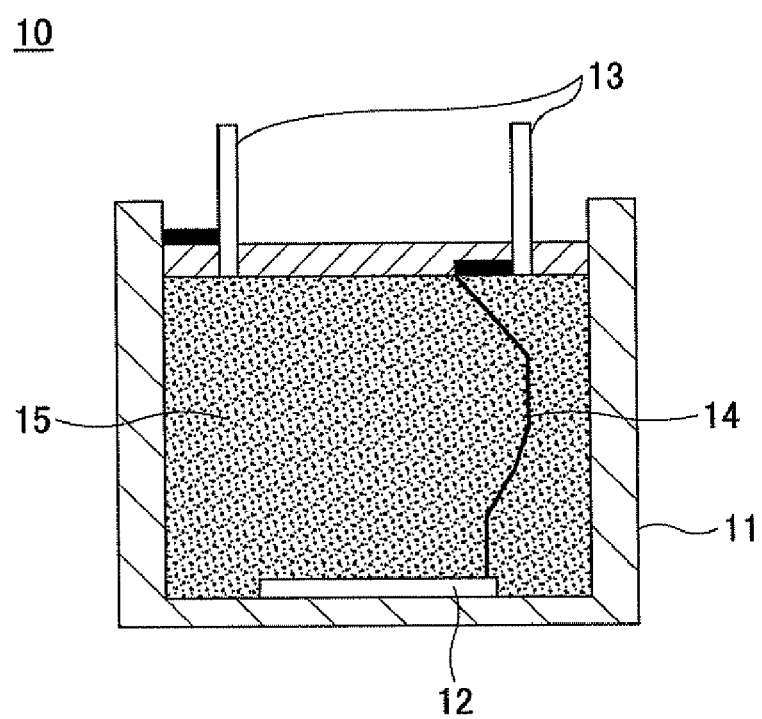
FIG. 11 is a schematic diagram showing an example of a conventional ultrasonic sensor.

When the thermal change of the piezoelectric element 112 no longer occurs after the filling material 119 is supplied into the case 111, the joining part 113c is removed (cut off) from the conductive member 113 (see FIGS. 8 and 10).

Thereby, the manufacturing of the ultrasonic sensor 100 is completed.

Hence, as described above, polarization loss can easily be prevented by integrally forming the first and second conductive parts 113a, 113b together with the joining part 113c beforehand and removing the joining part 113c after supplying the filling material 119 into the case 111.

It is noted that, if there are any other heating processes (processes liable to cause thermal change of the piezoelectric element 112) to be performed on the ultrasonic sensor 100, the joining part 113c is to be removed after all of the other heating processes are completed, in order to prevent loss of polarization caused by thermal change of the piezoelectric element 112.

Further, the present invention is not limited to these embodiments, but variations and modifications may be made without departing from the scope of the present invention.

The present application is based on Japanese Priority Application No. 2007-155271 filed on Jun. 12, 2007, with the Japanese Patent Office, the entire contents of which are hereby incorporated by reference.

What is claimed is:

1. A method of manufacturing an ultrasonic sensor including a case, a piezoelectric element having first and second electrodes, and a conductive member having first and second conductive parts, the method comprising the steps of:
   a) forming the conductive member by integrally forming the first and second conductive parts and a joining part that joins portions of the first and second conductive parts;
   b) mounting the piezoelectric element and the conductive member in the case so that the first conductive part is connected to the first electrode and the second conductive part is connected to the second electrode, and the joining part and the portions of the first and second conductive parts joined by the joining part are positioned outside of the case;
   c) supplying a filling material into the case; and
   d) removing the joining part after step c).

2. The method of manufacturing an ultrasonic sensor as claimed in claim 1, wherein the conductive member is formed by using a cladding material.

3. The method of manufacturing an ultrasonic sensor as claimed in claim 1, wherein the step a) includes a step of punching out the conductive member from a planar conductive material.

4. The method of manufacturing an ultrasonic sensor as claimed in claim 3, further comprising a step of:
   forming a notch part on each end of the joining part.

* * * * *